United States Patent
Crooks

[15] 3,673,890
[45] July 4, 1972

[54] AUXILIARY TRANSMISSION
[72] Inventor: James W. Crooks, Milwaukee, Wis.
[73] Assignee: Allis-Chalmers Manufacturing Company, Milwaukee, Wis.
[22] Filed: Sept. 3, 1970
[21] Appl. No.: 69,260

[52] U.S. Cl. ................................................74/681, 74/740
[51] Int. Cl. .........................................................F16h 37/08
[58] Field of Search ....................................74/740, 681, 781

[56] References Cited

UNITED STATES PATENTS 1,648,969  11/1927  Steuart ....................................74/681
1,921,598  8/1933  Anderson ............................74/681 X
3,533,307  10/1970  Gunderson ..............................74/740

Primary Examiner—Carlton R. Croyle
Assistant Examiner—Thomas C. Perry
Attorney—Arthur L. Nelson, Kenneth C. McKivett and Robert B. Benson

[57] ABSTRACT

An auxiliary transmission for transmission of power to or from a main transmission to increase the overall speed range of the power gear train in a vehicle.

10 Claims, 5 Drawing Figures

| | | MAIN TRANSMISSION | | | |
|---|---|---|---|---|---|
| | | 1ST. GEAR RATIO | 2ND GEAR RATIO | 3RD GEAR RATIO | 4TH GEAR RATIO |
| AUXILIARY TRANSMISSION | LOW | 8.17 | 5.08 | 3.47 | 1.6 |
| | INTER-MEDIATE | 7.37 | 4.28 | 2.67 | .8 |
| | HIGH | 5.1 | 3.18 | 2.17 | 1.0 |

Inventor
James W. Crooks
by
Attorneys

AUXILIARY TRANSMISSION

This invention relates to a transmission and more particularly to an auxiliary transmission used in conjunction with a main transmission to increase the speed and torque range of the vehicle power train.

The conventional power train on a vehicle provides a plurality speed ratio which in turn provides desired torque needed to pull the draft load on the vehicle such as a tractor. The power train may also provide a higher speed ratio such as the road gear and a reverse to provide the desired speed and maneuverability for the tractor.

Most modern tractors also include a quick shift ahead of the main transmission to increase the speed ratios of the power train. These quick shift auxiliary transmissions are usually of the two speed arrangement and extend the speed coverage of the main transmission on the low end of the speed range or on the high end of the speed range but not both. A more versatile arrangement would provide extension of the speed range both above and below the main transmission speed range. Accordingly this invention auxiliary transmission which operates both as an overdrive and an underdrive and also a direct drive through the main transmission, so it doubly extends the overall power train coverage.

This is accomplished by means of a gearing arrangement and therefore no extra controls, clutches, or gears are required than normally would be required for a single extension coverage mechanism. The auxiliary transmission illustrated shows a 3-speed unit but these same principals would apply to a 2-speed unit, which can be built from the 3-speed arrangement by leaving out the low speed range.

Accordingly it is an object of this invention to provide a two or a three speed auxiliary transmission to extend the speed range of the main vehicle transmission.

It is another object of this invention to provide an auxiliary transmission which extends the speed coverage of the main transmissions by extending the speed on the low and the high speed end of the transmission.

It is a further object of this invention to provide an auxiliary transmission extending the speed range of the main transmission through an overdrive and direct drive and an underdrive to extend the overall speed range of the vehicle power gear train.

It is a further object of this invention to provide an auxiliary transmission driving through a multiple speed transmission and providing in the lower speed ranges of the main transmission a direct drive and two underdrives while providing in the high speed range of the main transmission an underdrive, a direct drive, and an overdrive to thereby increase the speed range coverage of the power gear train of the vehicle.

The objects of this invention are accomplished by providing a planetary gear set in which the input drive is to the ring gear. The planetary gear drives directly through the main transmission or drives through a counter shaft gearset which drives around the main transmission. The selected power path through the main transmission or the countershaft gearset is controlled by the plurality of clutches and a brake. The clutching provides for locking of the planetary gearset and a direct drive through the main transmission or a combination drive through the main transmission or a combination drive through the main transmission and the countershaft gearset. Locking the sun gear to ground provides a drive from the planetary carrier through the main transmission. This arrangement provides a 3-speed unit but the same principal would apply for use of a 2-speed unit by leaving out the low range in which the brake locks the sun gear to ground or in other brakes the sun gear to the housing member. The main transmission as illustrated is a 4-speed transmission through which the auxiliary transmission operates and essentially provides 3-speed extension in each of the 4-speeds for an overall 12-speed power train for the vehicle.

The preferred embodiments of this invention are illustrated in the attached drawings.

While the main embodiments of this invention are shown in FIGS. 1 through 5, it is understood that these embodiments show a 3-speed auxiliary transmission for use in conjunction with the main transmission.

It is understood that while the preferred embodiments of this invention are shown in FIG. 1 through 5 that a 2-speed auxiliary transmission could be constructed by eliminating the braking feature of the auxiliary transmission shown. This would provide a 2-speed auxiliary transmission but would still provide the overdrive, direct drive and underdrive features of the auxiliary transmission for use in conjunction with the main transmission to extend the power train speed range coverage.

Figure 1:
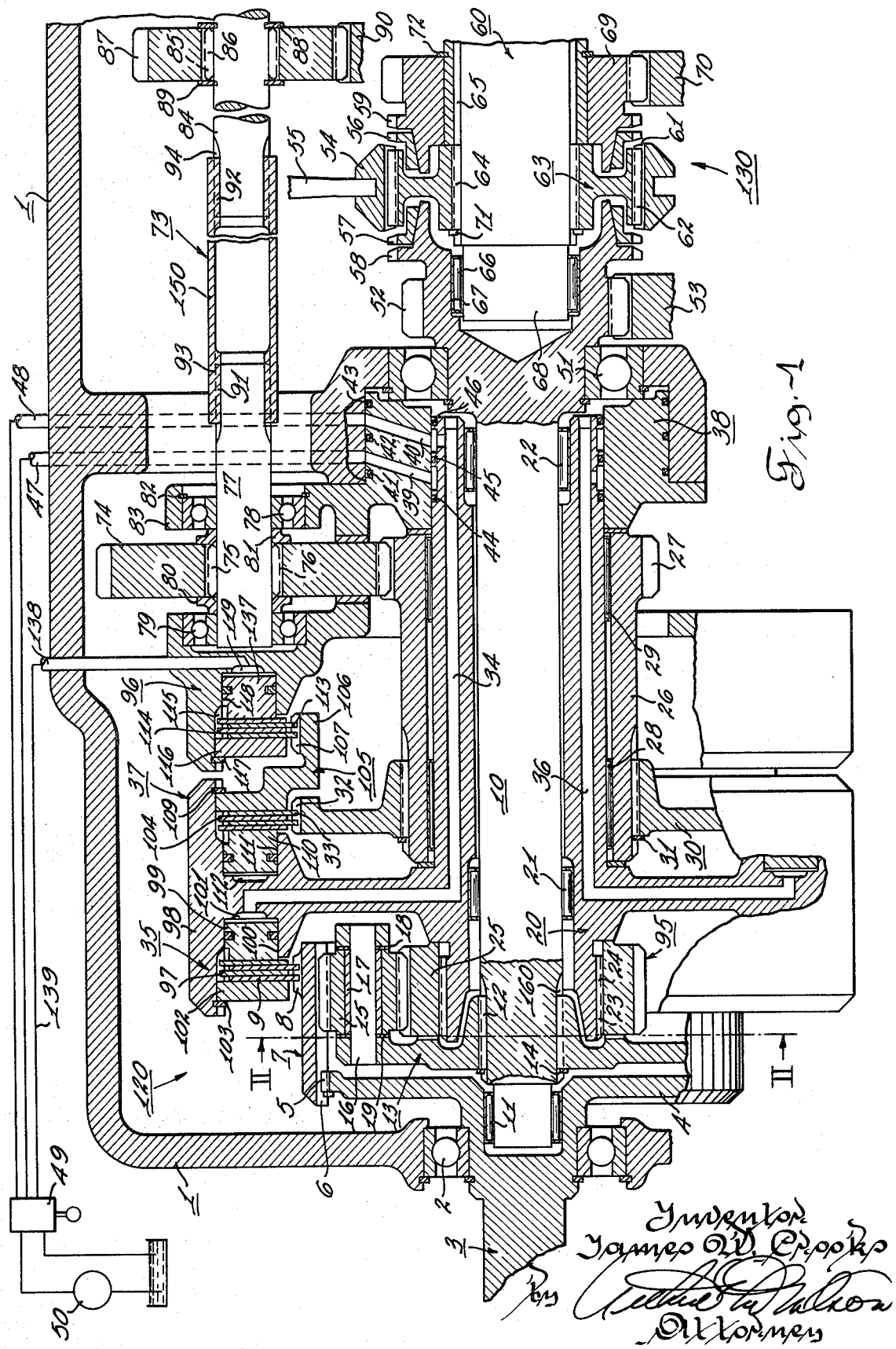
FIG. 1 illustrates the cross-section of the preferred embodiment of this invention.

Referring to FIG. 1 the transmission housing 1 supports the ball bearing assembly 2 which rotatably supports the input shaft 3. The input shaft 3 forms an integral radial flange 4 forming a spline 5 on its external periphery which receives the mating spline 6 of the ring gear 7. The ring gear 7 also has a spline 8 on its external periphery which receives a plurality of clutch disks 9. The drive shaft 10 is rotatably mounted on the bearing assembly 11 and rotates concentrically with the input shaft 3. The drive shaft 10 also forms a spline 160 which engages a mating spline 12 on the inner periphery on the planetary carrier 13. The planetary carrier 13 is retained in position by the snap ring 14.

Planetary carrier 13 carries a plurality of planet gears 15 which are carried on a shaft 16 supporting a bushing 17 rotatably mounting each planet 15. The shaft 16 also carries the spacers 18 and 19 on the end of each of the planet gears 15. The quill shaft 20 rotates on the roller bearing assemblies 21 and 22 which embrace the drive shaft 10.

The sleeve 26 and pinion gear 27 are formed integral and rotatably mount on the bearing assemblies 28 and 29. The bearing assemblies 28 and 29 embrace the quill shaft 20 and provide a freely rotatable support for the sleeve 26 and pinion gear 27. The clutch hub 30 is retained by the snap ring 31 on the sleeve 26. The clutch hub 30 forms a spline 32 on its external periphery which receives the clutch disks 33.

The quill shaft 20 forms passages 34 leading to the clutch 35 and passage 36 leading to the clutch 37. The collar 38 also defines the passages 39 and 40 which are in communication with the passages 36 and 34 respectively. The collar 38 is sealed with the housing by the seal 41, 42 and 43 and is sealed with the quill shaft by the seals 44, 45 and 46. The passages 39 and 40 in housing 1 are also connected to the conduits 47 and 48 respectively. Conduits 47 and 48 are connected through the valve 49 to the pump 50 to selectively actuate the clutches 35 and 37.

The housing 1 supports the bearing assembly 51 which in turn rotatably supports the inner end of the drive shaft 10 which is integrally with the drive gear 52. The drive gear 52 drives the gear 53 which will be described subsequently. As shown in FIG. 1 a clutch collar 54 is operated by a clutch lever 55 to selectively engage the collar 54 with the synchronizing rings 56 and 57. The clutch teeth 58 and 59 are selectively engaged by the collar 54 to drive the output shaft 60 or gear 69. Clutch collar 54 has a splined surface 61 which engages the splined surface 62 of the clutch sleeve 63. Clutch sleeve 63 also has an internal spline 64 which engages the external spline 65 to the output shaft 60. The bearing assembly 66 is received within the recess 67 in the drive shaft 10 and engages the annular facing 68 on the output shaft 60.

The gear 69 engages the gear 70. The clutch sleeve 63 is retained in position by the snap ring 71 while the gear 69 is retained in position by the snap ring 72.

The countershaft gear set 73 includes the gear 74 having a spline 75 engaging the spline 76 of the countershaft 77. The countershaft 77 is rotatably mounted in the bearing assemblies 78 and 79. The spacer 80 is positioned between the bearing assembly 79 and the gear 74 while the spacer 81 is positioned between the gear 74 and the bearing 78 and the snap ring 82 maintains the bearings and gear in place.

The bearing support 83 is integral with the collar 38. The countershaft 84 is also supported on the transmission housing 1 and forms a spline 85 which engages the internal spline 86 of gear 87. The gear 87 is retained in position on the countershaft 84 by the snap rings 88 and 89. Gear 87 meshes with the gear 90. The countershaft sleeve 150 is splined on its internal periphery at 91 and 92 and engages mating splines 93 and 94 of the countershafts 77 and 84 respectively.

The drive through the countershaft gear set 73 is initially transmitted through the clutch 37. The planetary gear set 95 is locked by actuation of the clutch 35. Brake 96 locks the sun gear 25 to the housing.

The clutch 35 includes the clutch disks 9 on the ring gear 8 and the clutch disks 97 on the clutch annulus 98 which is integral with the quill shaft 20. The piston 99 is received in the cylinder 100 and forms the fluid pressurizing chamber 101 in communication with the passage 34. The reaction plate 102 is retained within the clutch annulus 98 by the retainer ring 103. Actuation of clutch 35 engages the disks to lock the ring gear 7 with the sun gear 95.

Clutch 37 includes clutch disks 33 on the spline portion of the clutch hub 30 which engage the clutch disks 104 on the clutch annulus 98. The reaction plate 105 has an axial flange portion 106 defining the spline 107. The reaction plate 105 is also carried on the clutch annulus 98 and retained in position by the snap ring 109. The piston 110 is received within the cylinder 111 formed by the annulus 98. The piston 110 and the cylinder 111 form the fluid pressurizing chamber 112 in communication with the passage 36 in the hydraulic system.

The brake 96 includes the brake disk 113 on the splined portion 107 of the axial flange 106 of reaction place 105. The stator brake disks 114 are received on the spline portion 115. The reaction plate 116 is maintained in position by the snap ring 117. Actuation of brake 96 locks the sun gear 25 to the housing 1.

The brake 96 is actuated when piston 137 in cylinder 118 which forms a fluid pressurizing chamber 119 is actuated. The chamber 119 is in communication with the passage means 138 which is connected to the conduit 139 in the hydraulic system.

Figure 4:
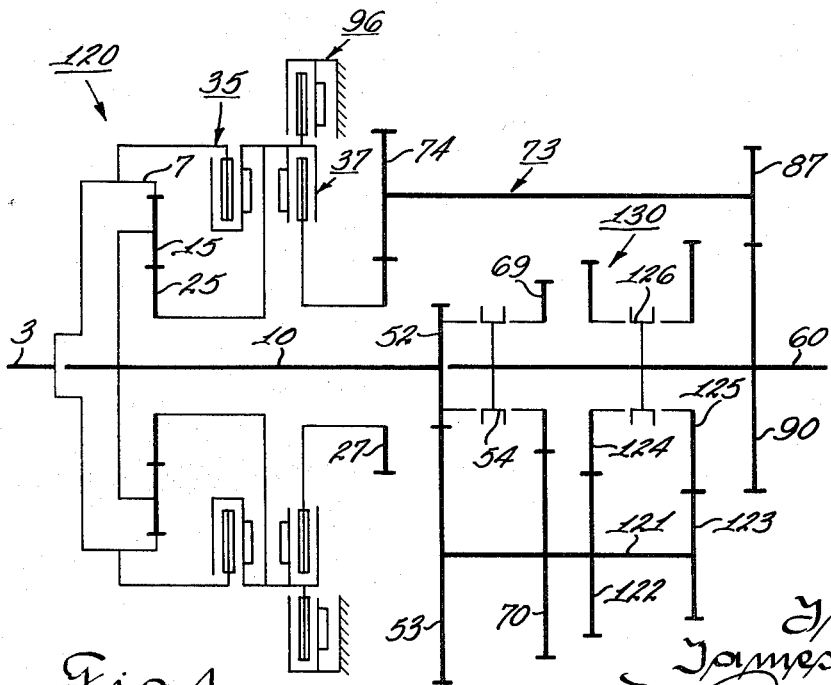
FIG. 4 illustrates a schematic view of one of the embodiments of this invention.

Referring to FIG. 4 the schematically illustrated auxiliary transmission 120 is the same as that shown in FIG. 1. The main transmission 130 is the same transmission in which a portion 130 is shown in FIG. 1. The gear 90 is connected to the output shaft 60 as shown in FIG. 4. The gear 52 drives through gear 53 which is connected to jackshaft 121. The jackshaft 121 is connected to the gear 70, gear 122 and gear 123. Gear 122 meshes with 124 while gear 123 meshes with gear 125. The clutch collar 126 selectively engages gear 124 for drive through the jackshaft 60, or gear 125 for drive through the jackshaft 60.

Figures 2, 5:
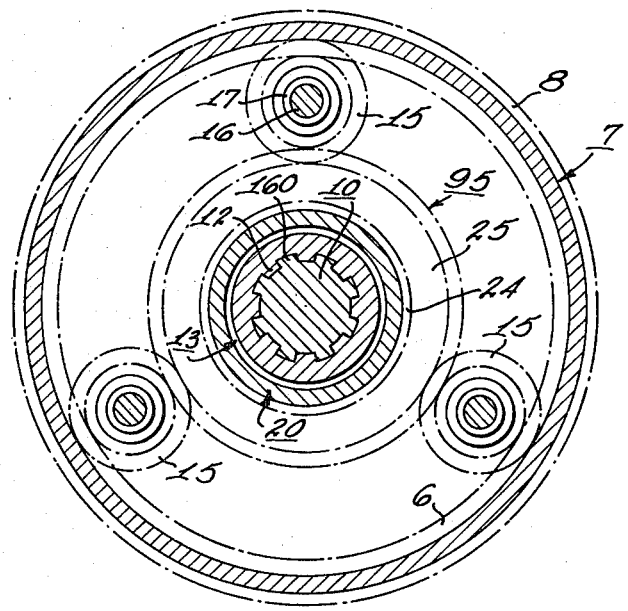
FIG. 2 illustrates a cross section view taken on line II—II of FIG. 1.
FIG. 5 illustrates the gear ratios of the main and auxiliary transmissions.

The speed ratios shown in FIG. 5 are overall ratios for the auxiliary transmission 120 and main transmission 130 and are not intended to be limiting but only for the purpose of illustration.

Figure 3:
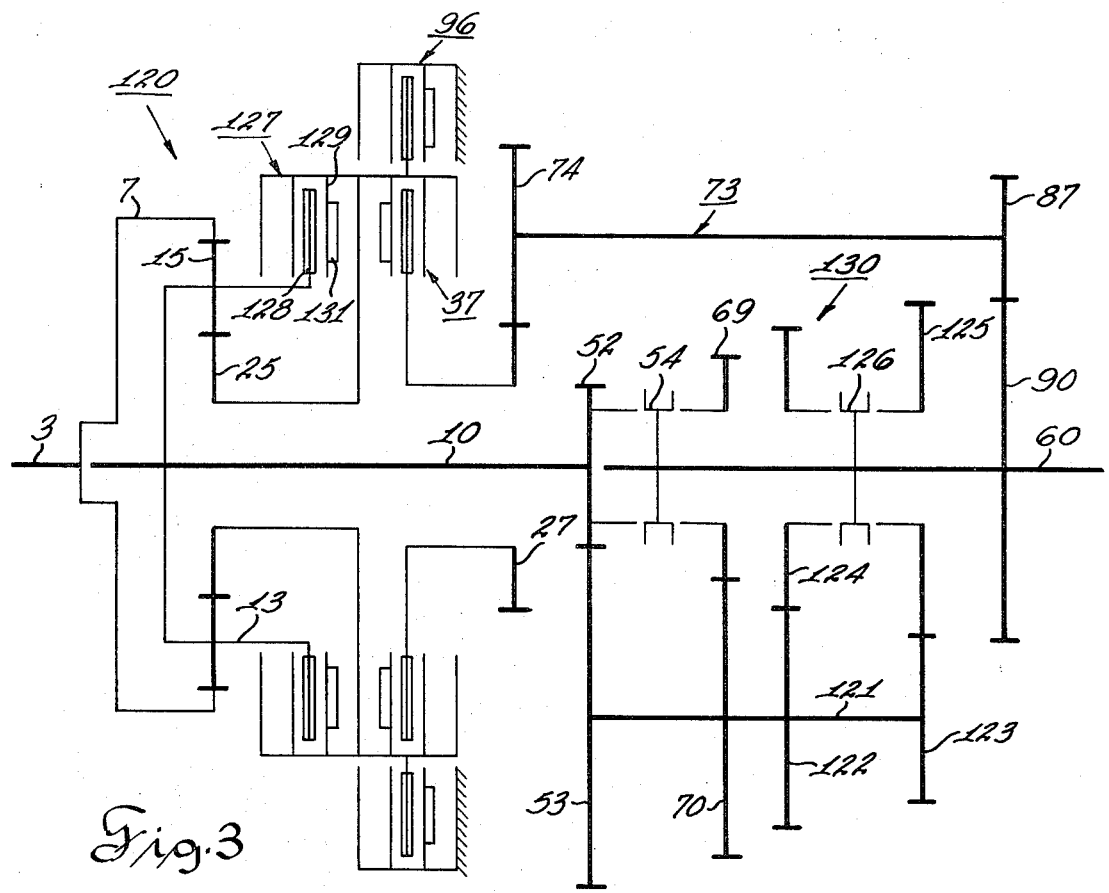
FIG. 3 illustrates schematically the preferred embodiment as shown in FIG. 1.

For the purpose of illustration, FIG. 3 is essentially the same as FIG. 4, and the numbers of the gears in the main transmission will be indicated by the same numbers. The auxiliary transmission 120, however, is modified to clutch the planetary carrier 13 to the sun gear 25. The clutch 126 includes the clutch disks 128 which engage the clutch disks 129 in response to operation of the hydraulic actuator 131. Although schematically illustrated in FIG. 3, the clutch 127 is essentially the same construction of that of clutch 35 as described in FIG. 1.

The operation in the auxiliary transmission and the main transmission will be described in the following paragraphs.

The drive from the input shaft 3 drives through the planetary gearset 95. The planetary carrier and the planetary gears freely rotating, the drive is transmitted through the sun gear 25 to the drive shaft 10. Drive shaft 10 is integral with the gear 52 and power is transmitted either through the clutch collar 54 when it clutches gear 52 to shaft 60 to directly drive through the main transmission 130, or through one of the gears 69, 124 and 125 which is selectively clutched. The clutch collar 54 can be shifted to engage the gear 69. In this position the driveshaft 10 drives through gear 52, 53 and jackshaft 121 through the gear 70 and gear 69 to the output shaft 60. This is considered the 3rd gear ratio of the main transmission. The clutch collar 126 can be shifted to engage gear 124 with the output shaft 60 and accordingly the drive then will drive from the driveshaft 10, through gear 52, gear 53, the jackshaft 60, gear 122, gear 124 to the output shaft 60. This is considered the second gear ratio.

When the clutch collar is positioned to clutch gear 125 to the output shaft 60, the transmission is in 1st gear ratio. The power is then transmitted from the drive shaft 10 through the gear 52, gear 53, jackshaft 121, gear 123, 125 to the output shaft 60.

When clutch 35, 37 and brake 96 are disengaged, the transmission drives through the planetary gear set 95 to the main transmission 130.

When the clutch 35 is locked, the sun gear 25 is locked to the ring gear 7 and the planetary gearset drives directly through drive shaft 10 and through the main transmission 130 in a 1 to 1 ratio. This is the high gear position for the auxiliary transmission 120. With the auxiliary transmission 120 in the high range the main transmission 130 can be selectively engaged in the 1st, 2nd, 3rd or 4th gear range.

The low gear range for the auxiliary transmission 120 is with the clutch 35 and 37 disengaged and the brake 96 engaged. In this position the sun gear 25 is locked to the housing causing the ring gear 7 to drive through the planetary gears 15 and the planetary carrier 13 to the drive shaft 10 to provide an underdrive. The main transmission can be selectively positioned in any of the gear ranges of 1st, 2nd, 3rd and 4th similarly as provided in the high range of the auxiliary transmission.

With the auxiliary transmission 120 operating with the brake 96 disengaged and the clutch 35 disengaged and clutch 37 engaged, the auxiliary transmission transmits power through the countershaft gearset 73 and the main transmission 130. The reaction torque is transmitted through the countershaft gearset 73 while the driving torque is transmitted through the main transmission 130. The reaction torque produces a negative rotation of the output gear 90 with relation to the driving torque transmitted through the main transmission 130. Counterrotation through countershaft gearset 73 to the output gear 90 and forward rotation through the main transmission to output shaft 60 provides an overdrive when the main transmission is in intermediate gear range.

Accordingly it can be seen that in the 4th gear range of the main transmission 130, an overdrive, a direct drive, and the underdrive are provided through the main and auxiliary transmission. When the main transmission is positioned in the 1st, 2nd and 3rd gear range, the overall power train including the auxiliary transmission 120 and the main transmission 130 provide two underdrives and a direct drive for the gear train.

The preferred embodiments of this invention have been illustrated as described.

I claim:

1. A gear train for power transmission comprising a main transmission including a plurality of gears and clutch means mounted in a housing providing a plurality of gear ratios, a drive shaft, a drive gear connected to said drive shaft, and an output shaft connected to an output shaft gear for selectively transmitting power at the plurality of gear ratios from said transmission, a countershaft gearset including a driven gear drivingly connected to said output shaft gear of said main transmission, an auxiliary transmission selectively and alternatively connected for driving said drive shaft, said auxiliary transmission including a planetary gearset having elements including a ring gear, a sun gear, and a plurality of planetary gears supported on a planetary carrier, an input shaft connected to said ring gear, said drive shaft connected to said planetary carrier and said drive shaft gear, a first clutch connected to said sun gear, a friction element of said clutch connected to at least one of said elements including said ring gear and said planetary carrier to selectively lock said planetary gearset, a countershaft drive gear for driving said countershaft gearset, a second clutch connected between said sun gear and said countershaft drive gear for selectively driving said countershaft gearset from said sun gear, means selectively and alternatively disengaging and engaging said clutches of said auxiliary transmission to increase the speed range of said main transmission when operated in conjunction with said auxiliary transmissions.

2. A gear train for power transmission as set forth in claim 1 including a brake on said housing having a friction element connected to said sun gear for braking said sun gear to the housing.

3. A gear train for power transmission as set forth in claim 1 wherein said first clutch includes a friction element connected to said planetary carrier to thereby lock to said planetary gearset to provide direct drive from said input shaft to said drive shaft.

4. A gear train for power transmission as set forth in claim 1 wherein said first clutch includes a friction element connected to said ring gear to thereby lock to said planetary gearset to provide direct drive from said input shaft to said drive shaft.

5. A gear train for power transmission as set forth in claim 1 wherein said second clutch includes a friction element connected to said countershaft drive gear providing a power path for reaction torque from said sun gear through said countershaft gearset to said output shaft for reaction torque and a power path for driving torque from said planetary carrier through said drive shaft and said main transmission to said output shaft.

6. A power train for use in a vehicle as set forth in claim 1 wherein said first clutch includes a friction element on said planetary carrier for locking said sun gear with said planetary carrier and said second clutch includes a friction element on said countershaft drive gear for connecting said sun gear with said countershaft gearset to thereby provide a reaction torque through said countershaft gearset to said output shaft and a driving torque through said main transmission.

7. A gear train for power transmission as set forth in claim 1 wherein said first clutch includes a friction element clutching said ring rear to said sun gear to lock said planetary gearset, said second clutch includes a friction element on said countershaft drive gear connecting said sun gear to said countershaft gearset to thereby provide reaction torque through said countershaft gearset and driving torque through said drive shaft in said main transmission to thereby provide an overdrive from said input shaft to said output shaft.

8. A gear train for power transmission as set forth in claim 1 including means for selectively engaging a high speed range in said main transmission, said second clutch includes a friction element on said countershaft drive gear providing power transmission from said sun gear to said countershaft gearset to thereby provide a reaction torque through said countershaft gearset to said output shaft, and said planetary carrier drives through said drive shaft to said main transmission to thereby provide overdrive from said input shaft to said output shaft.

9. A power train for use in a vehicle as set forth in claim 1 including means for selectively engaging a low speed range in said main transmission, a brake on said housing including a friction element connecting said sun gear with said housing to drive from said planetary carrier through said drive shaft and said main transmission to thereby provide an underdrive from said input shaft to said output shaft.

10. A power train for use in a vehicle as set forth in claim 1 wherein said first clutch includes a friction element on said ring gear for locking said planetary gearset to provide direct drive from said input shaft to said drive shaft.

* * * * *